No. 610,368.   Patented Sept. 6, 1898.
C. F. PHILLIPS.
FRUIT STRAINER.
(Application filed Feb. 25, 1898.)
(No Model.)
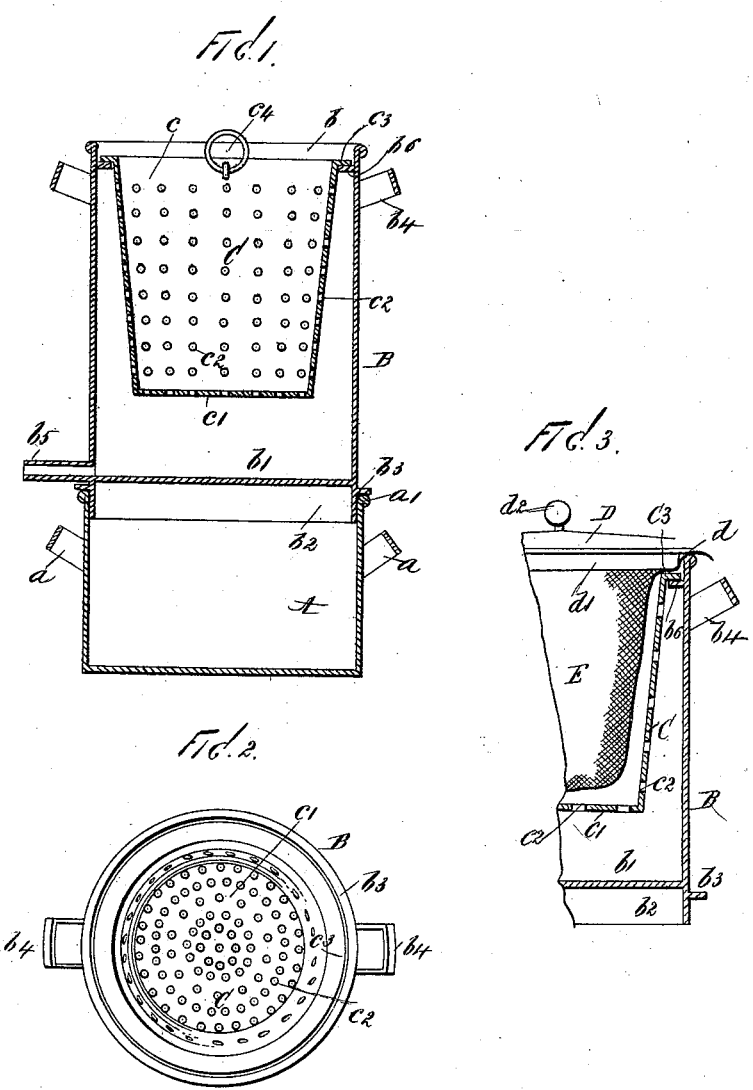
WITNESSES:
INVENTOR
Carrie F. Phillips,
BY
Edgar Tate & Co.
ATTORNEYS.

UNITED STATES PATENT OFFICE.

CARRIE FRICK PHILLIPS, OF NORFOLK, VIRGINIA.

FRUIT-STRAINER.

SPECIFICATION forming part of Letters Patent No. 610,368, dated September 6, 1898.

Application filed February 25, 1898. Serial No. 671,643. (No model.)

*To all whom it may concern:*

Be it known that I, CARRIE FRICK PHILLIPS, a citizen of the United States, residing at Norfolk, in the county of Norfolk and State of Virginia, have invented certain new and useful Improvements in Fruit-Strainers, of which the following is a full and complete specification, such as will enable those skilled in the art to which it appertains to make and use the same.

My invention relates to culinary utensils, and has especial relation to an improved fruit and jelly strainer which will be effectively adapted for household purposes and enable both convenience and economy in use.

The invention is fully disclosed in the following specification, of which the accompanying drawings form a part, in which the separate parts of my improvement are designated by the same letters of reference in each of the views, and in which—

Figure 1 is a vertical sectional view of a strainer embodying my improvements, and Fig. 2 is a top or plan view. Fig. 3 is a detail sectional view.

Referring to the drawings, A designates a cylindrical base portion or subvessel, which is adapted to form a support for the superposed straining vessel and which can also be employed as a receptacle for the strained juices. The vessel A has an open top and may be provided with laterally-projecting handles $a$, by which it can be conveniently manipulated.

B designates the straining vessel, which comprises a cylindrical body having an open top $b$ and a bottom $b'$. Beneath the bottom $b'$ projects an annular flange $b^2$, which is received within the open top end of the subvessel A, and a horizontal laterally-projecting flange $b^3$ is also provided upon the cylinder B and adapted to rest upon the top edge $a'$ of the vessel A and thus serve as a support for the straining vessel. The vessel B is provided with handles $b^4$, by which it may be conveniently manipulated, and at its bottom it is provided with a tubular outlet or extension $b^5$, preferably at the plane of the bottom $b'$, through which the strained juices may be poured.

C designates the strainer, which is in the form of a conical pan or vessel having an open top $c$ and a bottom $c'$, the bottom and side walls of said vessel being perforated, as at $c^2$. The strainer C is provided at its top edge with a laterally-projecting circumferential horizontal flange $c^3$, which rests upon a corresponding interiorly-projecting shoulder or flange $b^6$ near the top of the vessel B. The strainer C may be provided with pivoted rings $c^4$, interiorly arranged at its top edge, by which it may be conveniently manipulated.

D designates a top or cover which is adapted to be received within and close the top end of the vessel B. This cover is preferably provided with a circumferential shoulder $d$, resting over the top edge of the vessel B and forming an inwardly-projecting bottom portion or flange $d'$, which may rest, if desired, upon the top edge $c^3$ of the strainer C. The cover D may be provided with a knob $d^2$, by which it may be conveniently removed from or inserted into position. The office of this cover is to prevent flies, dust, &c., from entering the straining vessel, and the cover may also serve as a medium for holding a straining-cloth E, which is adjusted inside the strainer C. The top edge of this straining-cloth may be projected over the edge $c^3$ of the strainer C or over the top edge of the vessel B, so that it will be bound into position by the engagement of the top or cover D. This straining-cloth is adapted to form a sack or bag within the strainer C, into which the juice and pulp are poured and by which the pulp is retained during and after the operation of straining.

The operation and advantages of my invention will be readily understood. The straining-cloth is first placed inside the strainer C and the fruit or jelly is placed within the cloth, when the juices therefrom will be strained into the vessel B, from which they may be poured off through the outlet $b^5$. By reason of this improved construction and arrangement the operation of straining with my improved device can be accomplished conveniently and with facility and without danger of burning the hands of the operator. It will be understood that the several parts are separable for convenience in operation or for cleansing, the vessel B being detachable from the subvessel A and the strainer C being detachable from the vessel B. The subvessel A is adapted to contain boiling water during the operation of the device, the steam or heat generated from which will be continuously maintained under the bottom of the straining vessel B, so that the jelly and pulp are sufficiently heated to prevent it from congealing or thickening and to preserve a suitable liquid condition for effective straining.

Having fully described my invention, I claim as new and desire to secure by Letters Patent—

1. An improved straining device, comprising the subvessel having an open top, a straining vessel having an annular flange extending downwardly from its bottom and received by the open top of the subvessel and provided with an exterior circumferential flange adapted to rest upon the top edge of the subvessel, said straining vessel being provided with a tubular outlet on approximately the plane of its bottom and with an interiorly-projecting flange or shoulder near its open top end, and a perforated strainer having a circumferential laterally-projecting flange at its top edge adapted to rest upon the interior top flange of the straining vessel, the subvessel and straining vessel and strainer being relatively mounted and detachable, substantially in the manner and for the purpose set forth.

2. In an improved straining device, comprising the straining vessel having an interiorly-projecting flange or shoulder in its open top end, and a perforated strainer having a circumferential laterally-projecting flange at its top edge adapted to rest upon the interior flange of the straining vessel, the straining-cloth fitted within the perforated strainer and having its edge projected with respect to the open tops of the vessels, and a top or cover fitting within and closing the top end of the straining vessel and engaging the edge of the straining-cloth to bind the latter in position, substantially as and for the purpose set forth.

In testimony that I claim the foregoing as my invention I have signed my name, in presence of the subscribing witnesses, this 17th day of February, 1898.

CARRIE FRICK PHILLIPS.

Witnesses:
T. C. WHITE,
CHAS. T. LAUD.